(12) United States Patent
Li

(10) Patent No.: US 9,731,264 B2
(45) Date of Patent: Aug. 15, 2017

(54) METHOD AND APPARATUS FOR PREPARING AEROGEL BY DRYING UNDER REDUCED PRESSURE

(71) Applicant: HONG DA TECHNOLOGY (BEI JING) CO. LTD., Beijing (CN)

(72) Inventor: Guangwu Li, Beijing (CN)

(73) Assignee: HONG DA TECHNOLOGY (BEI JING) CO. LTD., Beijing (CN)

( * ) Notice: Subject to any disclaimer, the term of this patent is extended or adjusted under 35 U.S.C. 154(b) by 59 days.

(21) Appl. No.: 14/889,736

(22) PCT Filed: May 6, 2014

(86) PCT No.: PCT/CN2014/076835
§ 371 (c)(1),
(2) Date: Nov. 6, 2015

(87) PCT Pub. No.: WO2014/180299
PCT Pub. Date: Nov. 13, 2014

(65) Prior Publication Data
US 2016/0114304 A1   Apr. 28, 2016

(30) Foreign Application Priority Data

May 7, 2013   (CN) .......................... 2013 1 0163867

(51) Int. Cl.
*F26B 5/04* (2006.01)
*B01J 13/00* (2006.01)
(Continued)

(52) U.S. Cl.
CPC ....... *B01J 13/0091* (2013.01); *C01B 33/1585* (2013.01); *F26B 5/04* (2013.01);
(Continued)

(58) Field of Classification Search
CPC ..... F26B 5/00; F26B 5/04; F26B 5/044; B01J 13/0091; C01B 33/1585
(Continued)

(56) References Cited

U.S. PATENT DOCUMENTS 5,306,555 A   4/1994  Ramamurthi et al.
5,665,382 A * 9/1997  Grinstaff .............. A61K 9/0026
                                                          424/450
(Continued)

FOREIGN PATENT DOCUMENTS

CN   1928475   3/2007
CN   101671029  3/2010
(Continued)

OTHER PUBLICATIONS

International Search Report for PCT/CN2014/076835, dated Aug. 1, 2014, and English translation thereof, 4 pages total.

*Primary Examiner* — Stephen M Gravini
(74) *Attorney, Agent, or Firm* — Hamre, Schumann, Mueller & Larson, P.C.

(57) ABSTRACT

A method and an apparatus for preparing aerogel by drying under reduced pressure. The gel to be dried is placed into a sealed drying apparatus which can be depressurized by air extraction or/and can be heated to raise the temperature. The methods of reducing pressure by air extraction or/and raising temperature are acted upon the water and solvents within the aerogel to be dried, and an outward force is thus generated for the water and solvents to be volatilized outwards. By controlling the rates of reducing pressure by air extraction or/and raising temperature, the outward force is allowed to be equal to or close to the inward capillary force, such that the pores of the gel may not be collapsed or cracked. At the same time, drying is carried out continuously, and finally the interior water and solvents are removed completely.

5 Claims, 1 Drawing Sheet (51) Int. Cl.
    *C01B 33/158*    (2006.01)
    *F26B 9/06*    (2006.01)
    *F26B 21/04*    (2006.01)

(52) U.S. Cl.
    CPC .............. *F26B 5/044* (2013.01); *F26B 9/066* (2013.01); *F26B 21/04* (2013.01)

(58) Field of Classification Search
    USPC .................................................. 34/406, 202
    See application file for complete search history.

(56) References Cited

U.S. PATENT DOCUMENTS

| | | | | |
|---|---|---|---|---|
| 5,866,027 | A * | 2/1999 | Frank .................. | B01J 13/0091 |
| | | | | 252/62 |
| 7,803,529 | B1 * | 9/2010 | Cantor ................ | C12Q 1/6872 |
| | | | | 435/6.12 |
| 2010/0181387 | A1 * | 7/2010 | Zaffaroni .............. | A61M 15/06 |
| | | | | 239/13 |
| 2012/0316496 | A1 * | 12/2012 | Hoffmann ............. | A61L 29/085 |
| | | | | 604/103.02 |
| 2016/0114304 | A1 * | 4/2016 | Li ...................... | C01B 33/1585 |
| | | | | 34/406 |

FOREIGN PATENT DOCUMENTS

| | | | | |
|---|---|---|---|---|
| CN | 102826514 | 12/2012 | | |
| CN | 103272539 | 9/2013 | | |
| EP | 2995588 | A1 * | 3/2016 | ......... C01B 33/1585 |
| WO | WO 2014180299 | A1 * | 11/2014 | ......... C01B 33/1585 |

* cited by examiner

METHOD AND APPARATUS FOR PREPARING AEROGEL BY DRYING UNDER REDUCED PRESSURE

TECHNICAL FIELD

The present invention belongs to the technical field of preparing functional materials, and refers to a process method for preparing aerogel with porous, high specific surface area and light specific weight.

BACKGROUND ART

Aerogel is a solid with low density and high porosity obtained by removing the solvents and water within a nanopore network structure, wherein, the nanopore network structure consists of colloid particles or high polymer molecules coalescing with each other. Common $SiO_2$ aerogel is a high dispersive solid nano material consisting of a $SiO_2$ network frame and gas filling nanopores. The aerogel as an important product is widely known by scientists around the world, and the scientists around the world discovered numerous new features beyond imagination after decades of research. The aerogel has the features of low density, extremely high specific surface area, high porosity, etc., has uniquely excellent properties in mechanics, acoustics, thermotics, optics, chemistry, physics, and has a wide range of applications in the fields of thermal insulation materials, sound insulation materials, infrared rayabsorbing materials, catalyst materials, environmental protection materials, etc. However, the industrial scale production of the aerogel is limited by the complicated preparing process and the expensive drying apparatus. At present, the application of a small amount of aerogel prepared by employing supercritical drying apparatus and expensive cost is only limited to high-end uses such as military industry, aerospace, petroleum, sports accessories and so on.

The prior process technology for preparing aerogel is mainly divided into two parts, that is, the preparation of gel and the drying of the gel. As exemplified by the preparation of silicon dioxide aerogel, the silicon dioxide gel to be dried is prepared by using a silicon source, a solvent and a catalyst by the steps of hydrolysis, gelation, aging and solvent displacement; and then the aerogel is obtained by drying the gel through the method of supercritical carbon dioxide drying.

The most difficult problem during the preparation of the aerogel is to remove the water and solvents within the gel in case the structure can not be destroyed, whereas the bearing force of the ultra thin framework is extremely limited, and it is very easy for the pores to be collapsed and cracked by heating and drying. The collapse of the aerogel during drying is due to a capillary effect generated by its own structure during drying. The pores within the gel are similar to the capillaries. During drying, when a part of water and solvents within the gel are discharged out of the gel, a three-phase interface will appear, and the surface tension of the interface encourages the liquid in the interior to generate a concave surface in the capillary. The concave surface is generated by the surface tension, and this force is an inward force and tends to make the wall of the capillary collapse inwards. It is just used for preventing the forming of the surface tension by employing the supercritical method for drying. Common methods are ethanol and carbon dioxide supercritical drying methods. The ethanol supercritical drying requires pressure reaching 6.38 MP and high temperature at the same time. The carbon dioxide supercritical drying requires pressure reaching 7.38 MP. The vapor-liquid interface disappears when the ethanol or carbon dioxide is in a supercritical state, hence, the three-phase interface disappears, and there will be no surface tension. At this moment, a large number of carbon dioxide fluid or ethanol fluid displaces the water and solvents within the gel, then the carbon dioxide or ethanol is removed by reducing pressure, and the dried aerogel is obtained. However, the supercritical drying apparatus is a high pressure apparatus, and the use thereof is dangerous and expensive, so that the prepared product is expensive with poor yield at the same time. There is also an attempt to prepare the aerogel by employing the normal pressure method of heating or microwave. When the heating or microwave drying method is employed, it is difficult to accurately control the temperature, the temperature in the colloid is different according to the different distance from the heating source, the thickness of the colloid is not consistency and so on, so it causes that a large number of solvents and water existed within the colloid at different positions generates different vapor pressure due to different temperature. At the position with high temperature, the outward expansive force caused by the high vapor pressure will be larger than the capillary force, and the crack of the pores of the gel appears. At the position with low temperature, the vapor pressure will be low, and the outward expansive force caused by the vapor pressure is smaller than the capillary force, thus, the collapse of the pores of the gel appears. This heating or microwave drying method results in that the pores of the gel are cracked and collapsed, and the obtained silicon dioxide solid product is powdered. The collapse and crack of the pores cause that the dried product does not have insufficient pores, but has a large specific weight and poor thermal insulation, and does not have the characteristic of the aerogel. The bulk aerogel can also be obtained by the method of enhancing the gel strength; however, all the products obtained have high density and low porosity, and do not have excellent thermal insulation effect. Hence, the bulk aerogel with aerogel characteristics can be obtained only by removing the solvents and water within the aerogel in case of maintaining the aerogel with the three-dimensional pore structure and high porosity of the original gel.

If the supercritical drying method is not employed, the capillary force will appears when the three-phase interface appears during drying, and if the strength of the capillary wall can not bear this force, the capillary will be collapsed inwards. The aerogel prepared by drying can be the aerogel with excellent quality only by preventing the pores of the gel from being collapsed and cracked as much as possible.

CONTENTS OF THE INVENTION

An object of the present invention is to provide a method and an apparatus for preparing aerogel by drying under reduced pressure, in order to solve the problem that the prepared aerogel is expensive with extremely poor yield caused by the dangerous and expensive high pressure supercritical drying apparatus, and to solve the technical problem that it is difficult to accurately control the temperature and that the pores of the gel are cracked and collapsed due to the different temperatures in the colloid caused by the different distances from the heating source during the preparation of the aerogel by the normal pressure method.

The technical solution adopted by the present invention to achieve the above-mentioned object of the invention is as follow.

A method for preparing aerogel by drying under reduced pressure: The gel to be dried is placed into a sealed drying apparatus which can be depressurized by air extraction or/and can be heated to raise temperature. The method of reducing pressure by air extraction, i.e. gradient depressurization or slow depressurization, or the method of raising temperature, i.e. gradient temperature-raising or slow temperature-raising, or the method of controlling reducing pressure by air extraction and raising temperature in the meantime is employed for acting upon the water and solvents within the aerogel to be dried, and an outward force is thus generated for the water and solvents to be volatilized outwards. By controlling the rates of reducing pressure by air extraction or/and raising temperature, the outward force is allowed to be equal to or close to the inward capillary force, such that the pores of the gel may not be collapsed or cracked. At the same time, drying is carried out continuously, and finally the interior water and solvents are removed completely. The above-mentioned control of reducing pressure by air extraction is described as follow: When the vapor-liquid interface appears in the gel starting to be dried, the surface tension is formed on the vapor-liquid interface, and at the same time, the capillary force is generated on the three-phase interface. The capillary force represented by F1 is force pointing to the concave point of the liquid surface and tending to collapse inwards. At the same time, the depressurization also provides outward suction force acting upon the gel, and the outward suction force is represented by F2. When F1=F2, or F1 is close to F2, as long as the force difference is not enough to make gel with the surface starting to be dried at this moment be collapsed or cracked, until the solvents and water within the gel are extracted completely. The above-mentioned control of raising temperature is described as follow: Upon the action of raising temperature and heating, the water and solvents within the gel in the drying apparatus are discharged continuously, the vapor-liquid interface appears within the gel, the surface tension is generated on the vapor-liquid interface, and at the same time, the three-phase interface appears in the gel. The capillary force appears on the three-phase interface, and the capillary force is proportional to the surface tension, and is inversely proportional to the capillary radius. The capillary force represented by F3 is force tending to collapse inwards. The outward expansive force represented by F4 is generated by the increased vapor pressure of the water and solvents within the gel upon the action of heating. When F3=F4, or F3 is close to F4, as long as the force difference is not enough to make pores of the gel with the surface starting to be dried at this moment be collapsed or cracked, the gel will be gradually dried from the outside to the inside. At this moment, the pores of the gel are kept intact by gradually raising temperature and maintaining that F3=F4 or F3 is close to F4, until the solvents and water in the gel are baked and discharged completely and thoroughly. The above-mentioned control of reducing temperature by air extraction and raising temperature in the meantime is described as follow: Upon the double action of the depressurizing by air extraction and the temperature-raising, the water and solvents within the gel in the drying apparatus are discharged continuously, and the vapor-liquid interface appears within the gel. When the three-phase interface appears in the gel, the surface tension is generated. The capillary force represented by F5 is the force tending to collapse inwards. At the same time, the outward force represented by F6 is generated by the water and solvents within the gel caused upon the action of heating. The outward force represented by F7 is generated by the water and solvents within the gel upon the action of depressurization. When F5=F6+F7, or F5 is close to F6+F7, as long as the difference between the force is not enough to make pores of the gel with the surface starting to be dried at this moment be collapsed or cracked, the gel will be gradually dried from the outside to the inside. In case the pores of the gel are not collapsed or cracked, the solvents and water in the gel are gradually removed completely by baking and extraction. After completely removing the solvents and water in the gel, the residual high boiling point volatiles in the gel are removed by drying at the temperature of 180° C.

When the aerogel is prepared by employing the method of gradient depressurization or slow depressurization, the temperature in the drying apparatus is controlled to be 20-40° C., and most preferably to be 25-35° C. The starting drying pressure is ambient atmospheric pressure, and a vacuum pump is turned on for starting to dry under reduced pressure. The gradient or continuous pressure-control is accomplished by the method of controlling an intake valve or turning on/off the motor of the vacuum pump. The thickness of the aerogel is 0.5-10 centimeters. The rate of reducing pressure is: reducing pressure by the rate of 0.01-0.02 atmospheric pressure per ten minutes for the beginning first and second hours, reducing pressure by the rate of 0.02-0.03 atmospheric pressure per ten minutes for the third and fourth hours, reducing pressure by the rate of 0.03-0.04 atmospheric pressure per ten minutes after the fifth hour. According to the rates stated above, the pressure is gradually reduced to 0.5-0.6 atmospheric pressure and kept for 1.5-2.5 hours. A drying degree test is carried out, until the standard is reached by sampling, weighting and inspecting, that is, the aerogel dried under reduced pressure is placed into an oven, heated to 170° C.-190° C. rapidly, and dried for 10 minutes to 2 hours, and the silicon dioxide aerogel with high porosity, low density and low thermal conductivity is obtained after stopping heating.

Drying is performed by the method of gradient temperature-raising or slow temperature-raising. The aerogel with a thickness of 0.5-10 centimeters is placed into a heating apparatus, and is heated and dried. The starting temperature is ambient temperature. At the beginning, the cooling rate should be slow because the surface strength of the aerogel is very low, and the rate of raising temperature should be increased appropriately with the surface strength growing of the aerogel. The rate of raising temperature is: raising temperature by the rate of 0.1-0.3° C. per ten minutes for the beginning first and second hours, raising temperature by the rate of 0.3-0.6° C. per ten minutes for the third and fourth hours, raising temperature by the rate of 0.6-1.0° C. per ten minutes for the fifth and sixth hours, and raising temperature by the rate of 1.0-1.5° C. per ten minutes after the seventh hour. According to the rate stated above, the temperature is raised to 60° C. and kept for 30-50 minutes, until the standard is reached by sampling, weighting and inspecting. Then, the aerogel with a intact three-dimensional structure and high porosity is obtained by raising temperature to 170° C. to 180° C. rapidly and keeping for 15 minutes to 1 hour.

The method of controlling the gradient depressurization or gradual depressurization and gradient temperature-raising or gradual temperature-raising at the same time is employed. The aerogel with a thickness of 5-10 centimeters is placed into a drying apparatus which can be heated and depressurized by air extraction at the same time, and is heated and depressurized in the meantime. The depressurization is performed by the means of gradient depressurization or slow depressurization. At the beginning, the rate of reducing pressure should be slow because the surface structure strength of the aerogel is very low, and the rate of reducing pressure should be increased appropriately with the surface strength growing. When the aerogel is prepared by the method of drying under reduced pressure, the rate of reducing pressure is: reducing pressure by the rate of 0.01-0.02 atmospheric pressure per ten minutes for the beginning first and second hours, reducing pressure by the rate of 0.02-0.03 atmospheric pressure per ten minutes for the third and fourth hours, reducing pressure by the rate of 0.03-0.04 atmospheric pressure per ten minutes after the fifth hour. According to the rates stated above, the pressure is gradually reduced to 0.5-0.6 atmospheric pressure. Heating and drying are performed at the same time. The starting temperature is ambient temperature. At the beginning, the cooling rate should be slow because the surface strength of the aerogel is very low, and the rate of raising temperature should be increased appropriately with the surface strength growing of the aerogel. The rate of raising temperature is: raising temperature by the rate of 0.1-0.2 per ten minutes for the beginning first and second hours, raising temperature by the rate of 0.3-0.5 per ten minutes for the third and fourth hours, raising temperature by the rate of 0.5-0.7° C. per ten minutes after the fifth hour. According to the rate stated above, the temperature is raised to 60° C. and kept for 30-50 minutes, until the standard is reached by sampling, weighting and inspecting. Then, the aerogel with a intact three-dimensional structure and high porosity is obtained by raising temperature to 170° C. to 180° C. rapidly and keeping for 15 minutes to 1 hour.

Prior to prepare the aerogel by the above-mentioned drying method, if hydrophobic aerogel is required to be prepared, during a hydrophobic treatment, the gel after solvent displacement is immersed in a solution with the molar ratio of trimethyl chlorosilane:n-hexane/n-heptane=0.5-3:10 for 6-48 hours; after the hydrophobic treatment, in order to wash away the hydrochloric acid generated by the chlorosilane hydrophobic reaction, the hydrophobic treated gel can be further immersed in the n-hexane/n-heptane solution for 1-2 times and 1-2 hours for each time; and the obtained gel used as the gel to be dried is ready to be dried.

A drying apparatus for preparing aerogel by drying under reduced pressure comprises: a sealed apparatus with a door, a support frame provided in the sealed apparatus for placing a tray for placing the aerogel, a heater provided in the sealed apparatus, an gas inlet port and an gas outlet port with control valves provided on the sealed apparatus, a pipeline for vacuum pumping connected to the sealed apparatus, and a vacuum pump provided inside or outside. The sealed apparatus has one gas inlet port and two gas outlet ports, or has two or more gas inlet ports and two or more gas outlet ports. The pipeline with the valve is provided on each gas inlet port and gas outlet port; wherein, at least one gas discharging pipe for reducing pressure by air extraction connects to the vacuum pump and leads to a waste gas and waste liquid treatment apparatus, and at least one gas discharging pipe directly leads to the waste gas and waste water treatment apparatus. An internal circulation fan for heating and drying is provided on the sealed apparatus or/and the gas discharging pipeline.

The advantages and positive effects of the present invention are as follow: the defects of danger caused by high pressure and expensive apparatus in the supercritical drying method and the shortcoming of poor quality of the product obtained by the heating microwave drying method are overcome, and the aerogel with high strength and excellent properties is prepared by employing the method of drying under reduced pressure by gradient depressurization or/and drying by slow and gradient temperature-raising. The obtained silicon dioxide aerogel has high porosity, intact pores, large specific surface area, good thermal insulation property, low density and good elasticity.

DETAILED EMBODIMENTS

The present invention employs a method of applying outward force to the gel being dried for balancing the capillary force, so as to prevent the pores of the gel from being collapsed or cracked. The outward force is applied to the gel being dried, and made to be equal to or close to the inward capillary force, so as to prevent the pores of the gel from being collapsed or cracked. At the same time, the drying is carried out continuously, finally the interior water and solvents are removed completely, and the bulk aerogel with an intact three-dimensional structure and extremely high porosity can be obtained. The present invention provides two methods which can be used respectively or in the meantime. The two methods can apply the outward force to the gel being dried, and continuously maintain the external force which can balance the capillary force while the gel is drying, so as to obtain the aerogel.

The first method employed is reducing pressure by air extraction and gradient depressurization, and the second method employed is gradient temperature-raising and gradual temperature-raising.

Reducing pressure by air extraction: the gel to be dried is placed into a sealed apparatus which can be reduced pressure by air extraction, and a portion of gas in the drying apparatus is extracted from the drying apparatus by extracting gas and reducing pressure. The extracted gas includes the vaporized solvents and water in the gel. In order to maintain the vapor-liquid equilibrium, the water and solvents within the gel will continuously volatilize along with the gas continuously extracted from the drying apparatus, and finally the gel is completely dried. During the depressurization, the drying is performed from the outside to the inside layer by layer. The depressurization by air extraction makes the interior pressure larger than the external pressure, the water and solvents within the gel diffuse from the inside to the outside, and the outward force is formed. If the negative pressure of the depressurization is too low, the outward force is larger than the inward force, and when the wall strength of the gel is not enough to resist the force difference, the pores of the gel will be cracked outwards. On the contrary, if the inward capillary force is larger than the outward force, and when the wall strength of the gel is not enough to resist the force difference, the wall of the gel will be cracked inwards. Therefore, it is required to control the appropriate pressure and the rate of reducing pressure, so as to substantially balance the two forces. Gradient temperature-raising and gradually heating: the vapor pressure of the water and solvents within the gel is increased along with heating, thus more vapor is generated, and the vapor expands outwards and generates the outward force. If the heating temperature is too high, the outward force is larger than the inward force, and when the wall strength of the gel is not enough to resist the force difference, the pores of the gel will be cracked outwards. On the contrary, if the inward force is larger than the outward force, and when the wall strength of the gel is not enough to resist the force difference, the pores of the gel will be collapse inwards. The temperature level and the rate of raising temperature should be appropriately controlled, so as to substantially balance the outward expansive force and the capillary force generated in the interior, such that the gel may not be g cracked and collapsed when the gel is being dried. The resistance to the discharge of the water and solvents within the deep interior of the gel will continuously increase along with the performing of drying, and it is required to reduce pressure or increase temperature for overcoming the resistance. During the process of continuously drying the gel from the outside to the inside, the dried layer becomes thicker gradually, the strength of the external framework increases gradually, and the ability for resisting the capillary force is improved continuously, so that the helpful condition of reducing pressure or/and raising temperature is further provided. The resistance which continuously increases is overcome along with the increasing outward suction force by keeping reducing pressure or/and raising temperature, and the water and solvents within the deep interior of the gel are extracted continuously, until the gel is dried and forms the aerogel. The two methods employed herein can be used respectively or at the same time to accomplish this work.

Method one: the aerogel is prepared by the method of reducing pressure by air extraction and gradient depressurization. The pressure of the interior of the gel prepared under normal pressure is the same as environmental pressure. In order to prevent the pores within the gel from being collapsed, when the method of reducing pressure by air extraction is employed for drying, the gel to be dried is placed into a sealed drying apparatus which can be depressurized by air extraction, and the depressurization starts. The suction force generated by the water and solvents within the gel upon the action of reducing pressure by air extraction is the outward force. A part of water and solvents within the gel will vaporize and form gas because of their own vapor pressure. During the depressurization, the gas in the drying apparatus is extracted to the outside of the drying apparatus, thereby extracting the volatile gas of a part of water and solvents to the outside of the drying apparatus. Then, some water and solvents will volatilize for supplement so as to maintain their own stable vapor-liquid equilibrium. The gel will be gradually dried by continuously reducing pressure by extracting gas like this. When the vapor-liquid interface appears in the gel starting to be dried, the surface tension is generated on the vapor-liquid interface, and at the same time, the capillary force is generated on the three-phase interface. The capillary force represented by F1 is the force tending to collapse inwards. At the same time, the depressurization applies the outward suction force to the gel, and the outward suction force is represented by F2. When F1=F2, or F1 is close to F2, as long as the force difference is not enough to make gel with the surface starting to be dried at this moment be collapsed or cracked, the gel is continuously and gradually dried from the outside to the inside in case the pores of the gel will not be collapsed and cracked. Along with drying into the deep inside, the solvents and water within the deep interior of the gel can only be extracted by passing through the outside pores of the outside aerogel which has been dried, and the resistance is increased continuously. The outside aerogel which has been dried is dried inwards layer by layer, and the framework strength is increased gradually, thus the condition for further reducing pressure and increasing suction force is created. The suction force is gradually increased by employing the method of gradient depressurization, until the solvents and water in the gel are extracted completely, and finally the aerogel with an intact three-dimensional structure and high porosity is prepared.

Method two: the aerogel is prepared by the method of gradient temperature-raising and gradually heating. When the gel is prepared under normal pressure and normal temperature, the temperature of the inside and outside of the gel is the same. In order to prevent the pores within the gel from being collapsed, the method of gradient temperature-raising is employed for drying. The aerogel to be dried is placed into a sealed apparatus which can be heated and raised temperature, and then the slow temperature-raising is started. The vapor pressure of the water and solvents carried by the gel in the apparatus will be increased with increasing temperature, thus the water and solvents inside will be extracted from the interior of the gel with continuously increasing temperature, and be gradually discharged from the inside of the apparatus to the outside thereof through an air circulation system, so that the gel will be gradually dried. Some water and solvents are heated and volatilize by drying the gel with the heating method, so that the vapor-liquid interface will appear in the gel, and the capillary force is generated with the appearance of the three-phase interface of the solid, liquid and gas phases. The capillary force represented by F3 is the force tending to collapse inwards. At the same time, the outward expansive force represented by F4 is generated by the increased vapor pressure of the water and solvents within the gel upon the action of heating. When F3=F4, or F3 is close to F4, as long as the difference between the two force is not enough to make pores of the gel with the surface starting to be dried at this moment be collapsed or cracked, the gel will be gradually dried from the outside to the inside. The solvents and water in the deep interior of the gel can only be extracted by passing through the outside pores of the outside aerogel which has been dried, and the resistance is increased continuously. It is required to raise temperature for completely drying, and at this moment, the outside aerogel which has been dried gradually becomes thicker, the framework strength increases, and the condition for increasing the expansive force by raising temperature is created. At this moment, the pores of the gel are kept intact by gradually raising temperature and maintaining that F3=F4 or F3 is close to F4, until the solvents and water in the gel are baked and discharged completely and thoroughly, and finally the aerogel with an intact three-dimensional structure and high porosity is prepared.

Method three: the method one and method two are employed at the same time, that is, the aerogel is prepared by the method of controlling gradual reducing pressure and gradient temperature-raising and heating at the same time. It is extremely necessary to investigate appropriate process parameters because the two parameters of pressure and temperature are controlled at the same time. When the gel is prepared under normal pressure and normal temperature, the temperature in the inside and the outside of the gel is the same, so does the pressure in the inside and the outside of the gel. In order to prevent the pores within the gel from being collapsed, the method of reducing pressure and gradient temperature-raising is employed at the same time for drying. The aerogel to be dried is placed into a sealed apparatus which can be depressurized and raised temperature, and the depressurization by extracting air and temperature-raising are performed at the same time or successively. Upon the double action of reducing pressure by air extraction and heating, the water and solvents within the gel in the drying apparatus are discharged continuously, the vapor-liquid interface appears within the gel, and when the three-phase interface appears in the gel, the surface tension is generated. The capillary force represented by F5 is the force tending to collapse inwards. At the same time, the outward force represented by F6 is generated by the water and solvents within the gel upon the action of heating, and the outward force represented by F7 is generated by the water and solvents within the gel upon the action of depressurization. When F5=F6+F7, or F5 is close to F6+F7, as long as the force difference is not enough to make pores of the gel with the surface starting to be dried at this moment be collapsed or cracked, the gel will be gradually dried from the outside to the inside. Along with drying, the solvents and water within the gel can only be sucked and extracted by passing through the outside pores of the outside aerogel which has been dried, and the resistance is increased continuously, thus it is required to increase the outward force. The outside aerogel which has been dried is dried inwards layer by layer, the framework strength will be increased. In case the pores of the gel will not be collapsed or cracked, employing the method of combining gradually raising temperature and gradually reducing pressure will gradually remove the solvents and water in the gel completely by baking and extracting, and finally the aerogel with an intact three-dimensional structure and high porosity is prepared.

The method for preparing the aerogel by reducing pressure and drying of the present invention comprises four steps of preparing the gel, gel solvent displacement and hydrophobic treatment, drying by reducing pressure and baking, wherein, the steps are all prior art except the steps of drying by reducing pressure and raising temperature.

The steps of the first process solution are as follow:

1. Preparing the Gel

The precursor, solvents and catalyst are uniformly mixed according to appropriate ratio, and the hydrolysis is performed according to process time. Prior to gel or just begin to gel, the liquid to form gel is placed into a prepared tray, and the tray is placed into an aging case or into the drying case directly. The aging case is sealed, or the tray is sealed separately and directly. The gel is formed slowly in the tray, and the gelling rate directly relates to temperature, gel type, solvent concentration, hydrolysis pH value and gelling pH value. The gel is formed generally at room temperature 20-30° C. after placing for 20 minutes to 72 hours; and the higher temperature results in faster gelation. After gelation, the obtained gel is immersed in an ethanol solution or an ethanol solution with the precursor for soaking and aging. The aging time is between 6 hours to 48 hours, and 12-24 hours is more appropriate for balancing gel strength and productivity. As exemplified by the preparation of silicon dioxide aerogel, the selected materials includes, but should not be limited to, tetraethyl orthosilicate or tetramethyl orthosilicate as the silicon precursor source, ethanol as the solvent, anyone of formic acid, acetic acid, hydrofluoric acid, chlorhydric acid, etc. as the hydrolysis catalyst, and ammonia water as the gelation catalyst. The tetraethyl orthosilicate or tetramethyl orthosilicate, ethanol and water are uniformly mixed according to the molar ratio of 1:4-8:3-6, and the acid (the dilute solution thereof) is added slowly. For example, first, the hydrofluoric acid is diluted with water for adjusting the pH value to the value between 2 and 4, or preferably to the value between 3 and 4, and mixed uniformly. After stabilizing the pH value, glycerol or/and glycol or/and formamide or/and acetamide with the molar ratio to tetraethyl orthosilicate or tetramethyl orthosilicate of 0.01-0.2 can be added or not be added, and the addition will enhance the strength of the finally obtained aerogel. After stirring uniformly, the ammonia water solution diluted by ethanol, acetone or water is added slowly for adjusting the pH value to the value between 5 and 7.5, and preferably to the value between 6.3-6.9, and stirred for 5-60 minutes. Then, the liquid for preparing the gel is delivered to the tray for drying and placed into the aging case or the drying case. The aging case is sealed, or the tray is sealed. The gel is obtained after placing for 20 minutes to 72 hours. The gel is immersed into ethanol or the ethanol solution with 5 wt %-50 wt % of tetraethyl orthosilicate or tetramethyl orthosilicate, and aged for 12 hours to 72 hours, typically aged for 24-48 hours, so that the gel with improved strength is obtained. The temperature of this process is typically controlled to be 25-30° C.

2 Gel Solvent Displacement and Hydrophobic Treatment

The gel is immersed into the solution of n-hexane, n-heptane or the mixture thereof with any mixing ratio, and the solvent displacement is performed for 3-8 times with 1-6 hours for each time, typically for 4-6 times with 2-4 hours for each time. The purpose is to displace the water and ethanol within the gel as much as possible. At this moment, the hydrophilic aerogel is obtained by directly drying.

If it is required to prepare hydrophobic aerogel, the hydrophobic treatment is performed. The gel after solvent displacement is immersed in the solution with the molar ratio of trimethyl chlorosilane:n-hexane/n-heptane=0.5-3:10 for 6-48 hours. After the hydrophobic treatment, in order to wash away the hydrochloric acid generated by the chlorosilane hydrophobic reaction, the hydrophobic treated gel can be further immersed in the n-hexane/n-heptane solution for 1-2 times with 1-2 hours for each time. The gel obtained at this moment is used as the gel to be dried, and is ready to be dried.

3 Drying Under Reduced Pressure

When the aerogel is prepared by employing the method of gradient depressurization or slow depressurization, the temperature in the drying apparatus is controlled to be 20-40° C., and most preferably to be 25-35° C. The starting drying pressure is ambient atmospheric pressure, and a vacuum pump is turned on for starting to dry under reduced pressure. The gradient or continuous pressure-control is accomplished by the method of controlling the intake valve or turning on/off the motor of the vacuum pump. The thickness of the aerogel is 0.5-10 centimeters. The pressure is reduced by the rate of 0.01-0.02 atmospheric pressure per ten minutes for the beginning first and second hours, is reduced by the rate of 0.02-0.03 atmospheric pressure per ten minutes for the third and fourth hours, and is reduced by the rate of 0.03-0.04 atmospheric pressure per ten minutes after the fifth hour. When the pressure is gradually reduced to 0.5-0.6 atmospheric pressure, the pressure of 0.5-0.6 atmospheric pressure is kept for 1.5-2.5 hours. A drying degree test is carried out, until the standard is reached by sampling, weighting and inspecting.

4 Baking and Drying

The aerogel dried under reduced pressure is placed into the drying case, rapidly heated to 170° C.-190° C., and dried for 10 minutes to 2 hours (the drying time is selected according to the thickness of the aerogel, and the thicker aerogel requires longer drying time). Then, the silicon dioxide aerogel with high porosity, low density and low thermal conductivity is obtained after stopping heating.

The steps of the second process solution:

steps 1 and 2 are the same as those of the first process solution, and step 3 is heating and drying by gradient temperature-raising.

Drying is performed by employing the method of gradient temperature-raising or slow temperature-raising. The aerogel with a thickness of 0.5-10 centimeters is placed into a heating apparatus, and is heated and dried. The starting temperature is ambient temperature. At the beginning, the cooling rate should be slow because the surface strength of the aerogel is very low. The rate of raising temperature should be increased appropriately with the surface strength growing of the aerogel. The temperature is raised by the rate of 0.1-0.3° C. per ten minutes for the beginning first and second hours, is raised by the rate of 0.3-0.6° C. per ten minutes for the third and fourth hours, is raised by the rate of 0.6-1.0° C. per ten minutes for the fifth and sixth hours, and is raised by the rate of 1.0-1.5° C. per ten minutes after the seventh hour. The temperature is gradually raised to 60° C. and kept for 30-50 minutes, until the standard is reached by sampling, weighting and inspecting. Then, the aerogel with an intact three-dimensional structure and high porosity is obtained by raising temperature to 170° C.-180° C. rapidly and keeping for 15 minutes to 1 hour (the drying time is selected according to the thickness of the aerogel, and the thicker aerogel requires longer drying time).

The steps of the third process solution:

steps 1 and 2 are the same as those of the first process solution, and step 3 is heating by gradient temperature-raising and drying by gradient depressurization.

The method of controlling the gradient depressurization or gradual depressurization and gradient temperature-raising or gradual temperature-raising at the same time is employed. The aerogel with a thickness of 5-20 centimeters is placed into a drying apparatus which can be heated and depressurized by air extraction at the same time, and is heated and depressurized in the meantime. The depressurization is performed by the means of gradient depressurization or slow depressurization. At the beginning, the rate of reducing pressure should be slow, because the surface structure strength of the gel is very low. The rate of reducing pressure should be increased appropriately with the surface strength growing. When the aerogel is prepared by the method of drying under reduced pressure, the pressure is reduced by the rate of 0.01-0.02 atmospheric pressure per ten minutes for the beginning first and second hours, is reduced by the rate of 0.02-0.03 atmospheric pressure per ten minutes for the third and fourth hours, and is reduced by the rate of 0.03-0.04 atmospheric pressure per ten minutes after the fifth hour. When the pressure is gradually reduced to 0.5-0.6 atmospheric pressure, heating and drying are performed at the same time. The starting temperature is ambient temperature. At the beginning, the cooling rate should be slow because the surface strength of the aerogel is very low. The rate of raising temperature should be increased appropriately with the growing surface strength of the aerogel. The temperature is raised by the rate of 0.1-0.2 per ten minutes for the beginning first and second hours, is raised by the rate of 0.3-0.5 per ten minutes for the third and fourth hours, and is raised by the rate of 0.5-0.7° C. per ten minutes after the fifth hour. The temperature is gradually raised to 60° C. and kept for 30-50 minutes, until the standard is reached by sampling, weighting and inspecting. Then, the aerogel with a intact three-dimensional structure and high porosity is obtained by raising temperature to 170° C. to 180° C. rapidly and keeping for 15 minutes to 1 hour.

The above-mentioned sampling and weighting test means and standard are that: 100 grams of aerogel is taken, heated to 180° C. and kept for 15 minutes, and the drying standard is reached if the weight loss is less than 0.2 gram.

Figure 1:
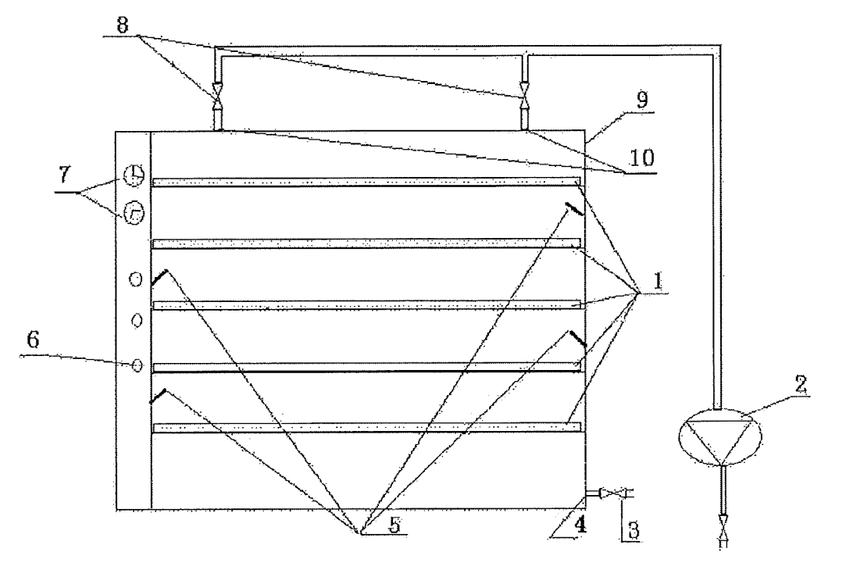
FIG. 1 is a structure schematic drawing of the apparatus for preparing the aerogel by drying under reduced pressure of the present invention.

The structure of the apparatus for preparing the aerogel by drying under reduced pressure according to the present invention with reference to FIG. 1 comprises: a sealed apparatus with a door 9, a tray for placing the aerogel and a placing support frame 1 provided in the sealed apparatus, a heater 6 provided in the sealed apparatus, gas inlet/outlet ports 4 and 10 with control valves provided on the sealed apparatus, a pipeline for vacuum pumping connected to the sealed apparatus, and a vacuum pump 2 provided inside or outside. The sealed apparatus has one gas inlet port and two gas outlet ports, or two or more gas inlet ports and two or more gas outlet ports. The pipeline with the valve is provided on each gas inlet port and gas outlet port, wherein, at least one gas discharging pipe for reducing pressure by air extraction connects to the vacuum pump and leads to the waste gas and waste liquid treatment apparatus, and at least one gas discharging pipe directly leads to the waste gas and waste water treatment apparatus. An internal circulation fan for heating and drying is provided on the sealed apparatus or the gas discharging pipeline. A gas inlet valve 3 and a gas outlet valve 8 are provided on the gas inlet pipeline and the gas discharging pipeline. A gas stream baffle 5 is provided on the inner side wall of the sealed apparatus 9, and a pressure gauge 7 is provided on the sealed apparatus 9.

A small amount of air from the outside enters the drying apparatus during reducing pressure by air extraction. The gas extracting port is on the top, and the gas inlet port is at the bottom. If the baffle is not provided, the entered air is directly discharged from the gas extracting port through the shortest path; whereas if the baffle is provided, the entered air can enter each layer placed with drying trays and homogenously take the volatile components of each layer away.

The embodiment described above is just for preparing the aerogel with a thickness of 0.5-10 centimeters. In the solution employing the above-mentioned gradient depressurization or gradual depressurization and gradient temperature-raising or gradual temperature-raising and heating, when the thickness of the gel is larger than 10 centimeters, it is required to reduce the rate of reducing pressure or raising temperature to 50-80% of the corresponding rate. Hence, within the protection extent of the present solution, as long as the rate of reducing pressure or raising temperature corresponding to the thickness of the aerogel is within the scope of the principle of the present patent, it should be considered as the equivalent technical solution of the present patent.

The invention claimed is:

1. A method for preparing aerogel or gel by drying under reduced pressure is that: the gel to be dried is placed into a sealed drying apparatus which can be depressurized by air extraction and heated to raise temperature; the method of depressurization by air extraction, gradient depressurization or slow depressurization, or temperature-raising, gradient temperature-raising or slow temperature-raising, or controlling the depressurization by air extraction and the gradient or slow temperature-raising in the meantime is acted upon water and solvents within the aerogel to be dried, and outward force is thus generated for the water and solvents to be volatilized outwards; by controlling rates of reducing pressure by air extraction and raising temperature, an outward force is allowed to be equal to or close to an inward capillary force, such that pores of the gel may not be collapsed or cracked; at the same time, drying is carried out continuously, and finally interior water and solvents are removed completely; the above-mentioned method of reducing pressure by air extraction is described as following:

when a vapor-liquid interface appears in the gel starting to be dried, surface tension is formed on the vapor-liquid interface; at the same time, a force pointing to a concave point of the liquid surface is generated on a three-phase interface, that is the force tending to collapse inwards, referred to as capillary force and represented by F1; at the same time, the depressurization also applies outward suction force represented by F2 to the gel; when F1=F2, or F1 is close to F2, as long as a force difference is not enough to make gel with the surface starting to be dried at this moment be collapsed or cracked, until the solvents and water in the gel are extracted completely; the above-mentioned method of raising temperature is described as following: upon action of raising temperature and heating, the water and solvents within the gel in the drying apparatus are discharged continuously, the vapor-liquid interface appears within the gel, and the surface tension is generated on the vapor-liquid interface; at the same time, the three-phase interface appears in the gel, the capillary force appears on the three-phase interface, and the capillary force is proportional to the surface tension, and is inversely proportional to a capillary radius; a second capillary force represented by F3 is the force tending to collapse inwards; outward expansive force represented by F4 is generated by increased vapor pressure of the water and solvents within the gel upon the action of heating; when F3=F4, or F3 is close to F4, as long as a force difference is not enough to make pores of the gel with the surface starting to be dried at a moment be collapsed or cracked, the gel will be gradually dried from the outside to the inside; at this moment, the pores of the gel are kept intact by gradually raising temperature and maintaining that F3=F4 or F3 is close to F4, until the solvents and water in the gel are baked and discharged completely and thoroughly; the above-mentioned method of reducing pressure by air extraction and the raising temperature in the meantime is described as following: upon a double action of the depressurization by air extraction and temperature-raising, the water and solvents within the gel in the drying apparatus are discharged continuously, the vapor-liquid interface appears within the gel, and when the three-phase interface appears in the gel, the surface tension is generated; a third capillary force represented by F5 is the force tending to collapse inwards; at the same time, a second outward force represented by F6 is generated by the water and solvents within the gel upon heating, and a third outward force represented by F7 is generated by the water and solvents within the gel upon depressurization; when F5=F6+F7, or F5 is close to F6+F7, as long as the force difference is not enough to make pores of the gel with the surface starting to be dried at this moment be collapsed or cracked, the gel will be gradually dried from the outside to the inside; in case the pores of the gel will not be collapsed and cracked, the solvents and water in the gel are gradually removed completely by baking and extraction; after completely removing the solvents and water in the gel by the above-mentioned methods, a residual high boiling point volatiles in the gel are removed by drying at a temperature of 180° C.

2. A method for preparing aerogel by drying under reduced pressure according to claim 1 is that, when the aerogel is prepared by employing the method of gradient depressurization or slow depressurization, the temperature in the drying apparatus is controlled to be one of 20-40° C., and 25-35° C.; the starting drying pressure is ambient atmospheric pressure, and a vacuum pump is turned on for starting to dry under reduced pressure; the gradient or continuous pressure-control is accomplished by the method of controlling an intake valve or turning on/off the motor of the vacuum pump; a thickness of the aerogel is 0.5-10 centimeters; a rate of reducing pressure is: reducing pressure by a rate of 0.01-0.02 atmospheric pressure per ten minutes for a beginning first and second hours, reducing pressure by a rate of 0.02-0.03 atmospheric pressure per ten minutes for a third and fourth hours, and reducing pressure by a rate of 0.03-0.04 atmospheric pressure per ten minutes after a fifth hour; according to rates stated above, the pressure is gradually reduced to 0.5-0.6 atmospheric pressure, and kept at a pressure for 1.5-2.5 hours; a drying degree test is carried out, until a standard is reached by sampling, weighting and inspecting, the aerogel dried under reduced pressure is placed into an oven, heated to 170° C.-190° C. rapidly, and dried for 10 minutes to 2 hours; and then, silicon dioxide aerogel with high porosity, low density and low thermal conductivity is obtained after stopping heating.

3. A method for preparing aerogel by drying under reduced pressure according to claim 1 is that, drying is performed by employing the method of gradient temperature-raising or slow temperature-raising; the aerogel with a thickness of 0.5-10 centimeters is placed into a heating apparatus, and is heated and dried; a starting temperature is ambient temperature; at a beginning, a cooling rate should be slow because surface strength of the aerogel is very low; a rate of raising temperature should be increased appropriately with the surface strength growing of the aerogel; the rate of raising temperature is: raising temperature by a rate of 0.1-0.3° C. per ten minutes beginning first and second hours, raising temperature by a rate of 0.3-0.6° C. per ten minutes for a third and fourth hours, raising temperature by the rate of 0.6-1.0° C. per ten minutes for a fifth and sixth hours, and raising temperature by the rate of 1.0-1.5° C. per ten minutes after a seventh hour; according to the temperature-raising rate stated above, the temperature is gradually raised to 60° C. and kept for 30-50 minutes, until a standard is reached by sampling, weighting and inspecting; and then, the aerogel with an intact three-dimensional structure and high porosity is obtained by raising temperature to 170° C. to 180° C. rapidly and keeping for 15 minutes to 1 hour.

4. A method for preparing aerogel by drying under reduced pressure according to claim 1 is that, the method of controlling the gradient depressurization or gradual depressurization and gradient temperature-raising or gradual temperature-raising at a same time is employed; the aerogel with a thickness of 5-10 centimeters is placed into a drying apparatus which can be heated and depressurized by air extraction at the same time, and is heated and depressurized at the same time; the depressurization is performed by the means of gradient depressurization or slow depressurization; at the beginning, the rate of reducing pressure should be slow, because surface structure strength of the gel is very low; a rate of reducing pressure should be increased appropriately with the surface strength growing; when the aerogel is prepared by the method of drying under reduced pressure, the rate of reducing pressure is: reducing pressure by the rate of 0.01-0.02 atmospheric pressure per ten minutes beginning first and second hours, reducing pressure by the rate of 0.02-0.03 atmospheric pressure per ten minutes for the third and fourth hours, and reducing pressure by the rate of 0.03-0.04 atmospheric pressure per ten minutes after a fifth hour; according to the rates stated above, the pressure is gradually reduced to 0.5-0.6 atmospheric pressure; heating and drying is performed at the same time; a starting temperature is ambient temperature; at a beginning, cooling rate should be slow because the surface strength of the aerogel is very low; the rate of raising temperature should be increased appropriately with the surface strength growing of the aerogel; the rate of raising temperature is: raising temperature by the rate of 0.1-0.2 per ten minutes for beginning first and second hours, raising temperature by the rate of 0.3-0.5 per ten minutes for third and fourth hours, and raising temperature by the rate of 0.5-0.7° C. per ten minutes after a fifth hour; according to the rate stated above, the temperature is raised to 60° C. and kept for 30-50 minutes, until a standard is reached by sampling, weighting and inspecting; and then, the aerogel with an intact three-dimensional structure and high porosity is obtained by raising temperature to 170° C. to 180° C. rapidly and keeping for 15 minutes to 1 hour.

5. A method for preparing aerogel by drying under reduced pressure according to claim 1, prior to prepare the aerogel by the drying method stated above, if hydrophobic aerogel or gel is required to be prepared, during the hydrophobic treatment, the gel after solvent displacement is immersed in a solution with a molar ratio of trimethyl chlorosilane:n-hexane/n-heptane=0.5-3:10 for 6-48 hours; after the hydrophobic treatment, in order to wash away hydrochloric acid generated by the chlorosilane hydrophobic reaction, the hydrophobic treated gel can be further immersed in the n-hexane/n-heptane solution for 1-2 times and 1-2 hours for each time; and the gel obtained at this moment is used as the gel to be dried, and is ready to be dried.

* * * * *